United States Patent
Sha et al.

(10) Patent No.: US 12,096,238 B2
(45) Date of Patent: Sep. 17, 2024

(54) METHOD AND APPARATUS FOR ENHANCING MULTI-CARRIER CELL, AND COMPUTER STORAGE MEDIUM

(71) Applicant: ZTE CORPORATION, Guangdong (CN)

(72) Inventors: Xiubin Sha, Shenzhen (CN); Bo Dai, Shenzhen (CN); Ting Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 544 days.

(21) Appl. No.: 16/559,428

(22) Filed: Sep. 3, 2019

(65) Prior Publication Data
US 2020/0037176 A1 Jan. 30, 2020

Related U.S. Application Data

(63) Continuation of application No. PCT/CN2018/071983, filed on Jan. 9, 2018.

(30) Foreign Application Priority Data

Mar. 1, 2017 (CN) .......................... 201710117524.2

(51) Int. Cl.
*H04W 16/26* (2009.01)
*H04L 27/26* (2006.01)
(Continued)

(52) U.S. Cl.
CPC ......... *H04W 16/26* (2013.01); *H04L 27/2607* (2013.01); *H04W 4/70* (2018.02);
(Continued)

(58) Field of Classification Search
CPC .... H04L 27/2607; H04W 16/26; H04W 4/70; H04W 4/80; H04W 72/04; H04W 72/0453; H04W 76/27; H04W 8/24
See application file for complete search history.

(56) References Cited

U.S. PATENT DOCUMENTS

| 10,912,089 B2 * | 2/2021 | Nader ...................... H04W 4/70 |
| 2010/0272051 A1 * | 10/2010 | Fu ........................ H04L 5/0037 370/329 |

(Continued)

FOREIGN PATENT DOCUMENTS

| CN | 1968066 A | 5/2007 |
| CN | 106162677 A | 11/2016 |

(Continued)

OTHER PUBLICATIONS

International Search Report of corresponding PCT Application No. PCT/CN2018/071983—6 pages (Mar. 27, 2018).

(Continued)

*Primary Examiner* — Khaled M Kassim
(74) *Attorney, Agent, or Firm* — Knobbe, Martens, Olson & Bear, LLP

(57) ABSTRACT

Disclosed are a method and apparatus for enhancing a multi-carrier cell, and a computer storage medium. The method includes: when broadcasting a common carrier list of a multi-carrier cell, simultaneously broadcasting, by a base station, at least one piece of following configuration information at the same time: a first common carrier list of a first-type user equipment (UE), or a second common carrier list of the first-type UE, where the first-type UE is a UE supporting a multi-carrier cell enhancement function; and if the broadcast configuration information includes the second common carrier list of the UE, simultaneously broadcasting indication information about whether the first-type UE can use a carrier in a common carrier list of a second-type UE, or a weight value of each carrier configured for the first-type UE is broadcast at the same time, where the second-type UE is a UE not supporting the multi-carrier cell enhancement function.

12 Claims, 8 Drawing Sheets

(51) Int. Cl.
*H04W 4/70* (2018.01)
*H04W 4/80* (2018.01)
*H04W 8/24* (2009.01)
*H04W 76/27* (2018.01)

(52) U.S. Cl.
CPC ............... *H04W 4/80* (2018.02); *H04W 8/24* (2013.01); *H04W 76/27* (2018.02)

(56) References Cited

U.S. PATENT DOCUMENTS

| | | | |
|---|---|---|---|
| 2011/0216730 A1* | 9/2011 | Kim | H04L 5/0092 370/329 |
| 2012/0093079 A1* | 4/2012 | Yuk | H04W 28/18 370/328 |
| 2017/0078994 A1* | 3/2017 | Dinan | H04W 56/0005 |
| 2018/0092095 A1* | 3/2018 | Zeng | H04L 5/0007 |
| 2018/0249511 A1* | 8/2018 | Rathonyi | H04J 1/065 |
| 2018/0287845 A1* | 10/2018 | Kim | H04L 5/005 |
| 2018/0376484 A1* | 12/2018 | Beale | H04W 72/0473 |
| 2019/0021021 A1* | 1/2019 | Thangarasa | H04W 4/70 |
| 2019/0174378 A1* | 6/2019 | Chang | H04W 76/27 |
| 2019/0372696 A1* | 12/2019 | Park | H04W 56/0015 |
| 2019/0386807 A1* | 12/2019 | Kazmi | H04L 5/0094 |
| 2020/0067690 A1* | 2/2020 | Park | H04W 52/243 |

FOREIGN PATENT DOCUMENTS

| | | |
|---|---|---|
| CN | 106304374 A | 1/2017 |
| CN | 106385709 A | 2/2017 |
| CN | 106455081 A | 2/2017 |
| EP | 2725861 A1 | 4/2014 |
| WO | WO 2014/058222 A1 | 4/2014 |

OTHER PUBLICATIONS

ZTE, "R2-166074 Further Consideration on Multi-carrier PRACH in NB-IoT", 3GPP TSG-RAN WG 2 Meeting#95bis ) Oct. 14, 2016).

CATT "Report of email discussion [95bis#25] [LTE/NB-IoT] RACH on non-anchor" Nov. 14-18, 2016, 3GPP TSG-RAN WG2 Meeting# 96—R2-168156.

Huawei "Summary of email discussion [96#49][LTE/eNB-IoT] Mutli-PRB RRC params (Huawei)" Feb. 13-17, 2017, 3GPP TSG-RAN WG2 #97—R2-1701433.

Supplementary European Search Report for EP 18761414 dated Oct. 30, 2020.

First Search Report for CN 201710117524.2 dated Jul. 23, 2020.
First Office Action for CN 201710117524.2 dated Mar. 31, 2020.

* cited by examiner a base station, when broadcasting a common carrier list of a multi-carrier cell, broadcasts at least one piece of following configuration information at the same time: a first common carrier list of a first-type UE, or a second common carrier list of the first-type UE, where the first-type UE is a UE supporting a multi-carrier cell enhancement function; and if the broadcast configuration information includes the second common carrier list of the first-type UE, the base station broadcasts indication information about whether the first-type UE can use a carrier in a common carrier list of a second-type UE, or a weight value of each carrier configured for the first-type UE at the same time, where the second-type UE is a UE not supporting the multi-carrier cell enhancement function

FIG. 1 a UE receives configuration information broadcast by a base station, and selects a target carrier according to a type of the UE and the configuration information, where the configuration information includes at least one of: a first common carrier list of a first-type UE, or a second common carrier list of the first-type UE, and the first-type UE is a UE supporting a multi-carrier cell enhancement function, and if the broadcast configuration information includes the second common carrier list of the first-type UE, the broadcast configuration information further includes indication information about whether the first-type UE can use a carrier in a common carrier list of a second-type UE, or a weight value of each carrier configured for the first-type UE, where the second-type UE is a UE not supporting the multi-carrier cell enhancement function

FIG. 2 a UE reports at least one piece of following information to a base station: a multi-carrier cell enhancement function support capability, or a radio quality value of where the UE locates, where at least one of the multi-carrier cell enhancement function support capability or the radio quality value of where the UE locates is reported through at least one of following contents: an information element of an uplink RRC message, or an MAC information unit carrying an association message

FIG. 3 a base station receives a multi-carrier cell enhancement function support capability reported by a UE the base station selects a carrier for carrying the UE based on the multi-carrier cell enhancement function support capability

FIG. 4

METHOD AND APPARATUS FOR ENHANCING MULTI-CARRIER CELL, AND COMPUTER STORAGE MEDIUM

CROSS-REFERENCES TO RELATED APPLICATIONS

This application claims priority to a Chinese patent application No. 201710117524.2 filed on Mar. 1, 2017, disclosure of which is incorporated herein by reference in its entirety.

TECHNICAL FIELD

The present application relates to the technical field of wireless communications and, in particular, to a method and an apparatus for enhancing a multi-carrier cell suitable for a NarrowBand-Internet of Things (NB-IoT), and a computer storage medium.

BACKGROUND

The Machine to Machine (M2M) communications is an important subject for the 5th generation (5G) mobile communication technology and is also an important application field for further wireless communications. In the M2M subject, a research sub-subject of the NarrowBand-Internet of Things (NB-IoT) has been proposed for a user equipment (UE) with low costs and low throughput. That is, a low-throughput wireless communication service is provided for NB-IoT low-cost UE within a spectrum bandwidth of 180 kHz. The spectrum of the NB-IoT comes from following three modes.

1. Stand-alone mode: which uses a frequency resource independent of a Long Term Evolution (LTE) carrier, such as a GSM/EDGE radio access network (GERAN) spectrum, as a carrier of the NB-IoT.

2. Guard band mode: which uses a resource block that is not used on a guard band of the LTE carrier as the carrier of the NB-IoT.

3. In-band mode: which uses a resource block in the LTE carrier as the carrier of the NB-IoT. Since the NB-IoT single-frequency point cell has only a bandwidth of 180 kHz, the remaining service channel capacity is very small except for overhead (the overhead of common channels accounts for about 40% of the single-frequency point cell) of a Narrowband primary synchronization signal (NPSS), a Narrowband secondary synchronization signal (NSSS), a Narrowband physical broadcast channel (NPBCH) and a system information block (SIB). In order to support massive terminals, multiple carriers are required to improve the network capacity. However if each carrier is independent as a cell, following problems will occur.

1. Each frequency point has the common channel such as the NPSS, the NSSS, the NPBCH and the SIB, which causes high overhead of the common channel and wastes the system resource.

2. Too many inter-frequency cells exist, which will challenge mobility management of an idle mode (the UE can only measure three inter-frequency points at most).

3. Each frequency point independent as a cell will increase power consumption of the terminal when selecting an initial cell.

Considering the above reasons, an NB-IoT introduces a multi-frequency point cell function. In the multi-frequency point cell function, a cell is consisting of multiple frequency points among which only one frequency point carries the common channel such as the NPSS, the NSSS, the NPBCH and the like, which is called as an anchor carrier, and remaining carriers are called as non-anchor carriers.

Since the NB-IoT carrier of the guard band mode and the in-band mode is associated with the LTE carrier, in order to weigh the performance of the NB-IoT system and the effect on the performance of the LTE system, conditions of using the multi-carrier cell in the NB-IoT standard are as follows.

1. The NB-IoT standard supports a multi-carrier cell consisting of in-band+in-band, in-band+guard band and guard band+guard band carriers. But the premise is that each carrier in the cell must be located in the same LTE cell, and the carrier span does not exceed 110 physical resource blocks (PRBs).

2. The NB-IoT standard supports a multi-carrier cell consisting of stand-alone+stand-alone carriers. But the premise is that the maximum frequency span does not exceed 20 MHz, and there is synchronization between carriers.

3. The NB-IoT standard does not support a multi-carrier cell consisting of stand-alone+in-band carriers or stand-alone+guard band carriers.

Since the NB-IoT standard does not support a multi-carrier cell consisting of stand-alone+in-band carriers or stand-alone+guard band carriers, when both the stand-alone carrier and the in-band/guard band carrier exist in the NB-IoT network, only the stand-alone carrier can form a cell, and the in-band/guard band carrier forms a cell. Since the maximum span between carriers in a cell is limited, when the maximum span between carriers exceeds the maximum span limit, the carriers can only be divided into multiple cells to meet the requirement of the maximum span limit. Load balance between carriers is required when different carriers form multiple cells, and however, since the current NB-IoT standard does not support service reconfiguration between cells, means of load balance between cells are limited.

SUMMARY

In order to solve the preceding technical problems, embodiments of the present application provide a method and apparatus for enhancing a multi-carrier cell, and a computer storage medium, so as to overcome the limitation existing among carriers of the NB-IoT multi-carrier cell and improve the performance of the NB-IoT network.

A method for enhancing a multi-carrier cell provided by an embodiment of the present application includes a step described below.

When broadcasting a common carrier list of the multi-carrier cell, a base station broadcasts simultaneously at least one piece of following configuration information: a first common carrier list of a first-type user equipment (UE) or a second common carrier list of the first-type UE. The first-type UE is a UE supporting a multi-carrier cell enhancement function.

If the broadcast configuration information includes the second common carrier list of the first-type UE, the base station simultaneously broadcasts indication information about whether the first-type UE can use a carrier in a common carrier list of a second-type UE, or a weight value of each carrier configured for the first-type UE. The second-type UE is a UE not supporting the multi-carrier cell enhancement function.

In the embodiment of the present application, the common carrier list includes at least one of: an uplink common carrier list, a downlink common carrier list, a paging carrier list, or a random access channel carrier list.

In the embodiment of the present application, supporting the multi-carrier cell enhancement function includes at least one of: supporting a multi-carrier cell consisting of an in-band mode and a stand-alone mode, supporting a multi-carrier cell consisting of a guard band mode and a stand-alone mode, supporting a multi-carrier cell whose carrier span exceeds a preset bandwidth, supporting a multi-carrier cell consisting of a frequency division multiplexing (FDD) mode carrier and a time division multiplexing (TDD) mode carrier, or supporting a multi-carrier cell consisting of TDD carriers with different configurations of uplink and downlink time slots.

A method for enhancing a multi-carrier cell provided by another embodiment of the present application includes a step described below.

A UE receives configuration information broadcast by a base station, and selects a target carrier according to a type of the UE and the configuration information.

The configuration information includes at least one of: a first common carrier list of a first-type UE, or a second common carrier list of the first-type UE. The first-type UE is a UE supporting a multi-carrier cell enhancement function. If the broadcast configuration information includes the second common carrier list of the first-type UE, the broadcast configuration information further includes indication information about whether the first-type UE can use a carrier in a common carrier list of a second-type UE, or a weight value of each carrier configured for the first-type UE. The second-type UE is a UE not supporting the multi-carrier cell enhancement function.

In the embodiment of the present application, if the configuration information received by the UE carries the first common carrier list of the first-type UE, there will be two situations described below.

In a condition that the type of the UE is the second-type UE, the configuration information further carries the common carrier list of the second-type UE, and a common carrier list that can be used by the second-type UE is the common carrier list of the second-type UE carried in the configuration information.

In a condition that the type of the UE is the first-type UE, a common carrier list that can be used by the first-type UE is the first common carrier list of the first-type UE carried in the configuration information.

In the embodiment of the present application, if the configuration information received by the UE carries the second common carrier list of the first-type UE, there will be one situation described below.

In a condition that the type of the UE is the second-type UE, the configuration information further carries the common carrier list of the second-type UE, and a common carrier list that can be used by the second-type UE is the common carrier list of the second-type UE carried in the configuration information.

If the configuration information carries a weight value of each carrier configured for the second-type UE, a weight of a common carrier that can be used by the second-type UE in initial carrier selection is determined based on the weight value of each carrier configured for the second-type UE.

In the embodiment of the present application, if the configuration information received by the UE carries the second common carrier list of the first-type UE, there will be two situations described below.

In a condition that the type of the UE is the first-type UE, if the configuration information carries indication information that the first-type UE cannot use the carrier in the common carrier list of the second-type UE, a common carrier list that can be used by the first-type UE is the second common carrier list of the first-type UE carried in the configuration information.

In a condition that the type of the UE is the first-type UE, if the configuration information does not carry the indication information about whether the first-type UE can use the carrier in the common carrier list of the second-type UE, or carries indication information that the first-type UE can use the carrier in the common carrier list of the second-type UE, a common carrier list that can be used by the first-type UE is a union set of the common carrier list of the second-type UE and the second common carrier list of the first-type UE carried in the configuration information.

In the embodiment of the present application, if the configuration information received by the UE carries the second common carrier list of the first-type UE, there will be one situation described below.

In a condition that the type of the UE is the first-type UE, if the configuration information carries the weight value of each carrier configured for the first-type UE, a common carrier list that can be used by the first-type UE in initial carrier selection is a union set of the common carrier list of the second-type UE and the second common carrier list of the first-type UE, where a weight value of each carrier in the common carrier list is determined based on the weight value of each carrier configured for the first-type UE.

In the embodiment of the present application, the initial carrier selection includes at least one of paging carrier selection or random access carrier selection.

A method for enhancing a multi-carrier cell provided by another embodiment of the present application includes a step described below.

A UE reports at least one piece of following information to a base station: a multi-carrier cell enhancement function support capability, or a radio quality value of where the UE locates.

At least one of the multi-carrier cell enhancement function support capability or the radio quality value of the UE is reported through at least one of following contents: an information element of an uplink radio resource control (RRC) message, or a media access control (MAC) information unit carrying an association message.

In the embodiment of the present application, the RRC message includes at least one of: an RRC connection request message, an RRC connection recovery request message, an RRC connection reestablishment request message, an RRC connection establishment completion message, an RRC connection recovery completion message, an RRC connection reestablishment completion message, an RRC reconfiguration completion message, a UE capability information message, or a UE information response message.

In the embodiment of the present application, the radio quality value of where the UE locates includes at least one of a measured reference signal receiving power (RSRP) or a cell coverage level (CEL) obtained through mapping based on a measured value.

The measured RSRP is used for the base station to perform at least one of: a CEL decision of a target carrier or configuring a quantity of repetitions of NarrowBand physical downlink control channel (NPDCCH)/NarrowBand physical downlink shared channel (NPDSCH) of the target carrier.

A method for enhancing a multi-carrier cell provided by another embodiment of the present application includes two steps described below.

A base station receives a multi-carrier cell enhancement function support capability reported by a UE.

The base station selects a carrier for carrying the UE based on the multi-carrier cell enhancement function support capability.

In the embodiment of the present application, if the base station receives indication information, reported by the UE, of supporting a multi-carrier cell enhancement function, at least one of a carrier of any mode in a cell or a carrier with an enhanced frequency span is selected as a target carrier when the carrier carrying the UE is selected.

In the embodiment of the present application, the method further includes a step described below.

If the base station does not receive the indication information, reported by the UE, of supporting the multi-carrier cell enhancement function or the base station receives indication information, reported by the UE, of not supporting the multi-carrier cell enhancement function, when the carrier carrying the UE is selected, there will be two situations described below.

If a current carrier is a stand-alone mode, a carrier in the stand-alone mode having a span smaller than or equal to a preset bandwidth from the current carrier is selected as the target carrier.

If a current carrier is an in-band mode or a guard band mode, a carrier in the in-band mode or the guard band mode having a span smaller than or equal to a preset bandwidth from the current carrier is selected as the target carrier.

In the embodiment of the present application, the method further includes a step that the base station determines a CEL of the target carrier based on a radio quality value reported by the UE. This step includes steps described below.

If the reported radio quality value is an RSRP value of the target carrier, the base station performs at least one of: obtaining a CEL value of the target carrier through a mapping based on the RSRP value, or configuring a quantity of repetitions of NPDCCH/NPDSCH of the target carrier based on the RSRP value.

If the reported radio quality value is a CEL value of the target carrier, the base station uses the CEL value as the CEL value of the target carrier.

If the reported radio quality value is an RSRP value of an original carrier, the base station calculates an RSRP value of the target carrier based on the reported RSRP value and a narrowband reference signal power difference of the original carrier and the target carrier; and the base station further performs at least one of: obtaining a CEL value of the target carrier through a mappingor configuring a quantity of repetitions of NPDCCH/NPDSCH of the target carrier based on the RSRP value of the target carrier.

An apparatus for enhancing a multi-carrier cell provided by an embodiment of the present application is applied to a base station. The apparatus includes a broadcast unit.

The broadcast unit is configured to, when broadcasting a common carrier list of the multi-carrier cell, simultaneously broadcast at least one piece of following configuration information at the same time: a first common carrier list of a first-type UE, or a second common carrier list of the first-type UE. The first-type UE is a UE supporting a multi-carrier cell enhancement function;

if the broadcast configuration information includes the second common carrier list of the first-type UE, simultaneously broadcast indication information about whether the first-type UE can use a carrier in a common carrier list of a second-type UE, or a weight value of each carrier configured for the first-type UE is broadcast at the same time, where the second-type UE is a UE not supporting the multi-carrier cell enhancement function.

In the embodiment of the present application, the common carrier list includes at least one of: an uplink common carrier list, a downlink common carrier list, a paging carrier list, or a random access channel carrier list.

In the embodiment of the present application, supporting the multi-carrier cell enhancement function includes at least one of: supporting a multi-carrier cell consisting of an in-band mode and a stand-alone mode, supporting a multi-carrier cell consisting of a guard band mode and a stand-alone mode, supporting a multi-carrier cell whose carrier span exceeds a preset bandwidth, supporting a multi-carrier cell consisting of an FDD mode carrier and a TDD mode carrier, or supporting a multi-carrier cell consisting of TDD carriers with different configurations of uplink and downlink time slots.

An apparatus for enhancing a multi-carrier cell provided by another embodiment of the present application is applied to a UE. The apparatus includes a reception unit and a selection unit. The reception unit is configured to receive configuration information broadcast by a base station.

The selection unit is configured to select a target carrier according to a type of the UE and the configuration information.

The configuration information includes at least one of: a first common carrier list of a first-type UE, or a second common carrier list of the first-type UE. The first-type UE is a UE supporting a multi-carrier cell enhancement function. If the broadcast configuration information includes the second common carrier list of the first-type UE, the broadcast configuration information further includes indication information about whether the first-type UE can use a carrier in a common carrier list of a second-type UE, or a weight value of each carrier configured for the first-type UE. The second-type UE is a UE not supporting the multi-carrier cell enhancement function.

In the embodiment of the present application, if the configuration information received by the reception unit carries the first common carrier list of the first-type UE, there will be two situations described below.

In a condition that the type of the UE is the second-type UE, the configuration information further carries the common carrier list of the second-type UE, and a common carrier list that can be used by the second-type UE is the common carrier list of the second-type UE carried in the configuration information.

In a condition that the type of the UE is the first-type UE, a common carrier list that can be used by the first-type UE is the first common carrier list of the first-type UE carried in the configuration information.

In the embodiment of the present application, if the configuration information received by the reception unit carries the second common carrier list of the first-type UE, there will be one situation described below.

In a condition that the type of the UE is the second-type UE, the configuration information further carries the common carrier list of the second-type UE, and a common carrier list that can be used by the second-type UE is the common carrier list of the second-type UE carried in the configuration information.

If the configuration information carries a weight value of each carrier configured for the second-type UE, a weight of a common carrier that can be used by the second-type UE in initial carrier selection is determined based on the weight value of each carrier configured for the second-type UE.

In the embodiment of the present application, if the configuration information received by the reception unit carries the second common carrier list of the first-type UE, there will be two situations described below.

In a condition that the type of the UE is the first-type UE, if the configuration information carries indication information that the first-type UE cannot use the carrier in the common carrier list of the second-type UE, a common carrier list that can be used by the first-type UE is the second common carrier list of the first-type UE carried in the configuration information.

In a condition that the type of the UE is the first-type UE, if the configuration information does not carry the indication information about whether the first-type UE can use the carrier in the common carrier list of the second-type UE, or carries indication information that the first-type UE can use the carrier in the common carrier list of the second-type UE, a common carrier list that can be used by the first-type UE is a union set of the common carrier list of the second-type UE and the second common carrier list of the first-type UE carried in the configuration information.

In the embodiment of the present application, if the configuration information received by the reception unit carries the second common carrier list of the first-type UE, there will be one situation described below.

In a condition that the type of the UE is the first-type UE, if the configuration information carries the weight value of each carrier configured for the first-type UE, a common carrier list that can be used by the first-type UE in initial carrier selection is a union set of the common carrier list of the second-type UE and the second common carrier list of the first-type UE, where a weight value of each carrier in the common carrier list is determined based on the weight value of each carrier configured for the first-type UE.

In the embodiment of the present application, the initial carrier selection includes at least one of paging carrier selection or random access carrier selection.

An apparatus for enhancing a multi-carrier cell provided by another embodiment of the present application is applied to a UE. The apparatus includes a reporting unit.

The reporting unit is configured to report at least one piece of following information to a base station: a multi-carrier cell enhancement function support capability, or a radio quality value of where the UE locates.

At least one of the multi-carrier cell enhancement function support capability or the radio quality value of where the UE locates is reported through at least one of following contents: an information element of an uplink RRC message, or an MAC information unit carrying an association message.

In the embodiment of the present application, the RRC message includes at least one of: an RRC connection request message, an RRC connection recovery request message, an RRC connection reestablishment request message, an RRC connection establishment completion message, an RRC connection recovery completion message, an RRC connection reestablishment completion message, an RRC reconfiguration completion message, a UE capability information message, or a UE information response message.

In the embodiment of the present application, the radio quality value of where the UE locates includes at least one of a measured RSRP or a CEL obtained through mapping based on a measured value.

The measured RSRP is used for the base station to perform at least one of a CEL decision of a target carrier or configuring a quantity of repetitions of NPDCCH/NPDSCH of the target carrier. An apparatus for enhancing a multi-carrier cell provided by another embodiment of the present application is applied to a base station. The apparatus includes a reception unit and a selection unit.

The reception unit is configured to receive a multi-carrier cell enhancement function support capability reported by a UE.

The selection unit is configured to select a carrier for carrying the UE based on the multi-carrier cell enhancement function support capability.

In the embodiment of the present application, if the reception unit receives indication information, reported by the UE, of supporting a multi-carrier cell enhancement function, at least one of a carrier of any mode in a cell or a carrier with an enhanced frequency span is selected as a target carrier when the carrier for carrying the UE is selected.

In the embodiment of the present application, if the reception unit does not receive the indication information, reported by the UE, of supporting the multi-carrier cell enhancement function or the base station receives indication information, reported by the UE, of not supporting the multi-carrier cell enhancement function, when selecting the carrier for carrying the UE, there will be two situations described below.

If a current carrier is a stand-alone mode, a carrier in the stand-alone mode having a span smaller than or equal to a preset bandwidth from the current carrier is selected as the target carrier.

If a current carrier is an in-band mode or a guard band mode, a carrier in the in-band mode or the guard band mode having a span smaller than or equal to a preset bandwidth from the current carrier is selected as the target carrier.

In the embodiment of the present application, the apparatus further includes a determination unit.

The determination unit is configured to determine a CEL of the target carrier based on a radio quality value reported by the UE, which specifically includes:
    if the reported radio quality value is an RSRP value of the target carrier, the base station performs at least one of: obtaining a CEL value of the target carrier through a mapping based on the RSRP valueor configuring a quantity of repetitions of NPDCCH/NPDSCH of the target carrier based on the RSRP value;
    if the reported radio quality value is a CEL value of the target carrier, the base station uses the CEL value as the CEL value of the target carrier; or
    if the reported radio quality value is an RSRP value of an original carrier, the base station calculates an RSRP value of the target carrier based on the reported RSRP value and a narrowband reference signal power difference of the original carrier and the target carrier; and performs at least one of: obtaining a CEL value of the target carrier through a mapping or configuring a quantity of repetitions of NPDCCH/NPDSCH of the target carrier based on the RSRP value of the target carrier.

In the technical solution of the embodiments of the present application, a base station, when broadcasting a common carrier list of a multi-carrier cell, simultaneously broadcasts at least one piece of following configuration information: a first common carrier list of a first-type UE, or a second common carrier list of the first-type UE, where the first-type UE is a UE supporting a multi-carrier cell enhancement function, and if the broadcast configuration information includes the second common carrier list of the UE, simultaneously broadcasts indication information about whether the first-type UE can use a carrier in a common carrier list of a second-type UE, or a weight value of each carrier configured for the first-type UE; and the second-type UE is a UE not supporting the multi-carrier cell enhancement function. The UE receives configuration information broadcast by a base station, and selects a target carrier according to a type of the UE and the configuration information. By adopting the technical solution of the embodiments of the present application, the limitation existing among carriers of the NB-IoT multi-carrier cell is overcame and the performance of the NB-IoT network is improved through configuration of the carrier and the corresponding selection manner.

BRIEF DESCRIPTION OF DRAWINGS

The drawings generally illustrate various embodiments discussed in the present disclosure by way of example and not by way of limitation.

FIG. 1 is a flowchart one of a method for enhancing a multi-carrier cell according to an embodiment of the present application;

FIG. 2 is a flowchart two of a method for enhancing a multi-carrier cell according to an embodiment of the present application;

FIG. 3 is a flowchart three of a method for enhancing a multi-carrier cell according to an embodiment of the present application;

FIG. 4 is a flowchart four of a method for enhancing a multi-carrier cell according to an embodiment of the present application;

DETAILED DESCRIPTION

Figure 5:
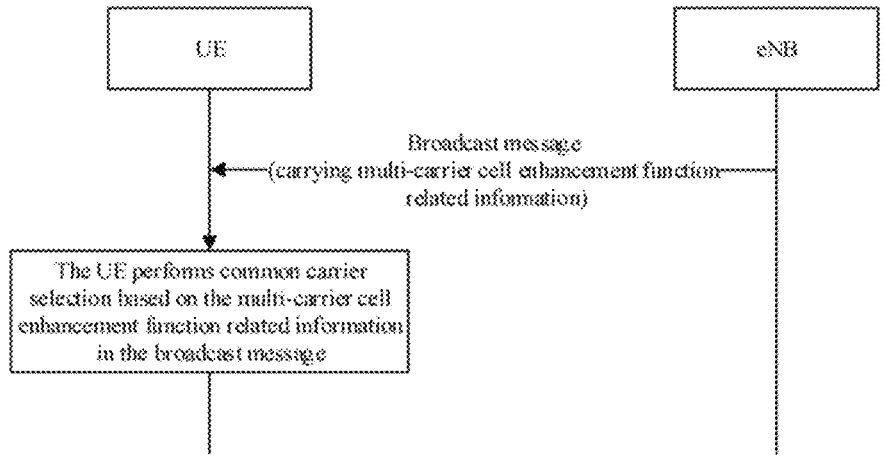
FIG. 5 is a flowchart of common carrier information configuration and UE initial carrier selection according to an embodiment of the present application.

To provide a more detailed understanding of features and technical content of embodiments of the present application, the implementation of the embodiments of the present application is described below in detail in conjunction with the drawings. The drawings are provided for reference only and are not intended to limit the embodiments of the present application.

FIG. 1 is a flowchart one of a method for enhancing a multi-carrier cell according to an embodiment of the present application. The method for enhancing the multi-carrier cell herein is applied on a base station side. As shown in FIG. 1, the method includes step 101 described below.

In step 101, a base station, when broadcasting a common carrier list of a multi-carrier cell, broadcasts at least one piece of following configuration information at the same time: a first common carrier list of a first-type UE, or a second common carrier list of the first-type UE, where the first-type UE is a UE supporting a multi-carrier cell enhancement function; and if the broadcast configuration information includes the second common carrier list of the first-type UE, the base station broadcasts indication information about whether the first-type UE can use a carrier in a common carrier list of a second-type UE, or a weight value of each carrier configured for the first-type UE at the same time, where the second-type UE is a UE not supporting the multi-carrier cell enhancement function.

The first common carrier list is one common carrier list configured for the first-type UE, the second common carrier list is another common carrier list configured for the first-type UE, and the second common carrier list may also be referred to as an additional common carrier list. In the embodiment of the present application, the common carrier list includes at least one of: an uplink common carrier list, a downlink common carrier list, a paging carrier list, or a random access channel carrier list.

In the embodiment of the present application, supporting the multi-carrier cell enhancement function includes at least one of: supporting a multi-carrier cell consisting of an in-band mode and a stand-alone mode, supporting a multi-carrier cell consisting of a guard band mode and a stand-alone mode, supporting a multi-carrier cell whose carrier span exceeds a preset bandwidth, supporting a multi-carrier cell consisting of an FDD mode carrier and a TDD mode carrier, or supporting a multi-carrier cell consisting of TDD carriers with different configurations of uplink and downlink time slots.

FIG. 2 is a flowchart two of a method for enhancing a multi-carrier cell according to an embodiment of the present application. The method for enhancing the multi-carrier cell herein is applied on a UE side. As shown in FIG. 2, the method includes step 201 described below.

In step 201, a UE receives configuration information broadcast by a base station, and selects a target carrier according to a type of the UE and the configuration information, where the configuration information includes at least one of: a first common carrier list of a first-type UE, or a second common carrier list of the first-type UE, and the first-type UE is a UE supporting a multi-carrier cell enhancement function, and if the broadcast configuration information includes the second common carrier list of the first-type UE, the broadcast configuration information further includes indication information about whether the first-type UE can use a carrier in a common carrier list of a second-type UE, or a weight value of each carrier configured for the first-type UE, where the second-type UE is a UE not supporting the multi-carrier cell enhancement function.

In the embodiment of the present application, if the configuration information received by the UE carries the first common carrier list of the first-type UE, there will be two situations described below.

In a condition that the type of the UE is the second-type UE, the configuration information further carries the common carrier list of the second-type UE, and a common carrier list that can be used by the second-type UE is the common carrier list of the second-type UE carried in the configuration information.

In a condition that the type of the UE is the first-type UE, a common carrier list that can be used by the first-type UE is the first common carrier list of the first-type UE carried in the configuration information.

In the embodiment of the present application, if the configuration information received by the UE carries the second common carrier list of the first-type UE, there will be one situation described below.

In a condition that the type of the UE is the second-type UE, the configuration information further carries the common carrier list of the second-type UE, and a common carrier list that can be used by the second-type UE is the common carrier list of the second-type UE carried in the configuration information. If the configuration information carries a weight value of each carrier configured for the second-type UE, a weight value of a common carrier that can be used by the second-type UE in initial carrier selection is determined based on the weight value of each carrier configured for the second-type UE.

In the embodiment of the present application, if the configuration information received by the UE carries the second common carrier list of the first-type UE, there will be two situations described below.

In a condition that the type of the UE is the first-type UE, if the configuration information carries indication information that the first-type UE cannot use the carrier in the common carrier list of the second-type UE, a common carrier list that can be used by the first-type UE is the second common carrier list of the first-type UE carried in the configuration information.

In a condition that the type of the UE is the first-type UE, if the configuration information does not carry the indication information about whether the first-type UE can use the carrier in the common carrier list of the second-type UE, or carries indication information that the first-type UE can use the carrier in the common carrier list of the second-type UE, a common carrier list that can be used by the first-type UE is a union set of the common carrier list of the second-type UE and the second common carrier list of the first-type UE carried in the configuration information.

In the embodiment of the present application, if the configuration information received by the UE carries the second common carrier list of the first-type UE, there will be one situation described below.

In a condition that the type of the UE is the first-type UE, if the configuration information carries the weight value of each carrier configured for the first-type UE, a common carrier list that can be used by the first-type UE in initial carrier selection is a union set of the common carrier list of the second-type UE and the second common carrier list of the first-type UE, where a weight value of each carrier in the common carrier list is determined based on the weight value of each carrier configured for the first-type UE.

Weight values configured for the first-type UE may be configured according to respective carriers in a carrier list of the second-type UE, or a total weight value may be configured for the carrier list of the second-type UE. If the weight values are configured according to respective carriers, a related UE can directly take corresponding weight values to select carriers. If a total weight value is configured according to the carrier list, the related UE first decides whether to select this carrier list according to the total weight value, and then selects specific carriers according to the weight values in the carrier list if this carrier list is selected. For example, the carrier list is a union set of a set 1 and a set 2. Weight values of the set 1 are only for the first-type UE, and weight values of the set 2 include two kinds of weight values: weight values for the second-type UE and weight values for the first-type UE. The weight values for the first-type UE may be configured in two manners: 1) configured overall according to the set 2; and 2) configured separately according to respective carriers in the set 2. If the weight values of the first-type UE are configured overall according to the set 2, the first-type UE first decides whether to select this carrier list according to the total weight value. If the carrier list is selected, specific carriers are selected according to the weight values in this list. If the weight values of the first-type UE are configured separately according to respective carriers in the set 2, the first-type UE directly takes weight values corresponding to the first-type UE from the weight values of respective carriers in the set 2.

The initial carrier selection includes at least one of paging carrier selection or random access carrier selection.

FIG. 3 is a flowchart three of a method for enhancing a multi-carrier cell according to an embodiment of the present application. The method for enhancing the multi-carrier cell herein is applied on a UE side. As shown in FIG. 3, the method includes step 301 described below.

In step 301, a UE reports at least one piece of following information to a base station: a multi-carrier cell enhancement function support capability, or a radio quality value of where the UE locates, where at least one of the multi-carrier cell enhancement function support capability or the radio quality value of where the UE locates is reported through at least one of following contents: an information element of an uplink RRC message, or an MAC information unit carrying an association message.

In the embodiment of the present application, the RRC message includes at least one of: an RRC connection request message, an RRC connection recovery request message, an RRC connection reestablishment request message, an RRC connection establishment completion message, an RRC connection recovery completion message, an RRC connection reestablishment completion message, an RRC reconfiguration completion message, a UE capability information message, or a UE information response message.

In the embodiment of the present application, the radio quality value of where the UE locates includes at least one of a measured RSRP or a CEL obtained through mapping based on a measured value.

In the embodiment of the present application, the measured RSRP is used for at least one of a CEL decision of a target carrier or configuring a quantity of repetitions of NPDCCH/NPDSCH of the target carrier.

FIG. 4 is a flowchart four of a method for enhancing a multi-carrier cell according to an embodiment of the present application. The method for enhancing the multi-carrier cell herein is applied on a base station side. As shown in FIG. 4, the method includes steps 401 and 402 described below.

In step 401, a base station receives a multi-carrier cell enhancement function support capability reported by a UE.

In step 402, the base station selects a carrier for carrying the UE based on the multi-carrier cell enhancement function support capability.

In the embodiment of the present application, if the base station receives indication information, reported by the UE, of supporting a multi-carrier cell enhancement function, at least one of a carrier of any mode in a cell or a carrier with an enhanced frequency span is selected as a target carrier when the carrier for carrying the UE is selected.

In the embodiment of the present application, if the base station does not receive the indication information, reported by the UE, of supporting the multi-carrier cell enhancement function or the base station receives indication information, reported by the UE, of not supporting the multi-carrier cell enhancement function, when the carrier for carrying the UE is selected, there will be two situations described below.

If a current carrier is a stand-alone mode, a carrier in the stand-alone mode having a span smaller than or equal to a preset bandwidth from the current carrier is selected as the target carrier.

If a current carrier is an in-band mode or a guard band mode, a carrier in the in-band mode or the guard band mode having a span smaller than or equal to a preset bandwidth from the current carrier is selected as the target carrier.

In the embodiment of the present application, the method further includes a step that the base station determines a CEL of the target carrier based on a radio quality value reported by the UE.

The step includes:
if the reported radio quality value is an RSRP value of the target carrier, the base station obtains a CEL value of the target carrier through a mapping based on the RSRP value, and/or configures a quantity of repetitions of NPDCCH/NPDSCH of the target carrier based on the RSRP value; if the reported radio quality value is a CEL value of the target carrier, the base station uses the CEL value as the CEL value of the target carrier;
if the reported radio quality value is an RSRP value of an original carrier, the base station calculates an RSRP value of the target carrier based on the reported RSRP value and a narrowband reference signal (NRS) power difference between the original carrier and the target carrier, and then obtains a CEL value of the target carrier through a mapping and/or configures a quantity of repetitions of NPDCCH/NPDSCH of the target carrier based on the RSRP value of the target carrier.

The solution provided by the embodiments of the present application will be further described below in detail in conjunction with specific application scenarios.

EMBODIMENT 1 the embodiment is related examples of common carrier information configuration and UE initial carrier selection, as shown in FIG. 5. Specific steps of the embodiment are described below.

In step 1, the base station, when broadcasting a common carrier list of a multi-carrier cell through an SIB, simultaneously broadcasts at least one piece of multi-carrier cell enhancement related information: a common carrier list of a UE supporting a multi-carrier cell enhancement function, or an additional common carrier list of the UE supporting the multi-carrier cell enhancement function; and if the broadcast information includes an operation mode of the carrier or the additional common carrier list of the UE supporting the multi-carrier cell enhancement function, the base station simultaneously broadcasts an indication about whether the UE supporting the multi-carrier cell enhancement function can use a carrier in a common carrier list of an ordinary UE or a weight value of each carrier additionally configured for the UE supporting the multi-carrier cell enhancement function.

The common carrier list includes an uplink common carrier list, a downlink common carrier list, and/or a paging carrier list, and a random access channel carrier list.

The supporting the multi-carrier cell enhancement function refers to supporting a multi-carrier cell of in-band+stand-alone and guard-band+stand-alone, and/or supporting a multi-carrier cell whose carrier span exceeds 20 MHz.

In step 2, the UE performs initial carrier selection of the UE based on the multi-carrier cell enhancement related information broadcast by the base station.

The initial carrier selection of the UE includes paging carrier selection and/or random access (PRACH) carrier selection.

Reference of the strategy of the initial carrier selection of the UE is made in embodiments 2, 3 and 4.

EMBODIMENT 2

Figure 6:
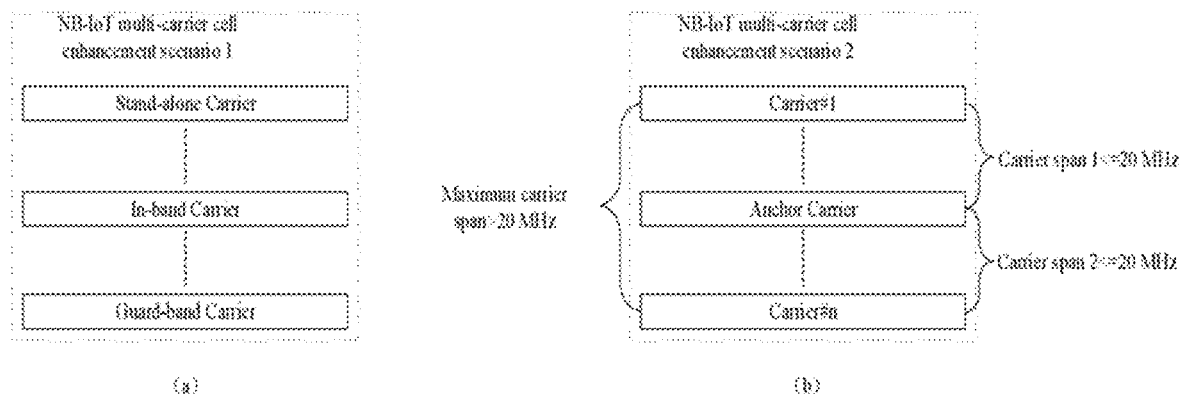
FIG. 6 is a schematic diagram of a specific example of multi-carrier cell enhancement according to an embodiment of the present application.

FIG. 6 is a schematic diagram of a specific example of multi-carrier cell enhancement according to an embodiment of the present application. In this example:

In the same multi-carrier cell shown in part (a), both a stand-alone carrier and an in-band and/or a guard-band carrier are included.

In the same multi-carrier cell shown in part (b), the maximum carrier span is greater than 20 MHz. Specifically, a frequency of an anchor carrier is greater than a frequency of a carrier with a minimum frequency in the cell and is less than a frequency of a carrier with a maximum frequency in the cell, and assuming that a carrier span between a minimum carrier and the anchor carrier is Carrier span 1 and a carrier span between a maximum carrier and the anchor carrier is Carrier span 2, Carrier span 1<=20 MHz, Carrier span 2<=20 MHz and Carrier span 1+Carrier span 2>20 MHz.

In the same multi-carrier cell shown in part (c), both an FDD carrier and a TDD carrier are included. A guard band is between the FDD carrier and the TDD carrier.

In the same multi-carrier cell shown in part (d), in a multi-carrier cell consisting of TDD carriers, different carriers may be provided with different uplink and downlink time slot configurations. A guard band is between carriers with different uplink and downlink time slot configurations.

EMBODIMENT 3

Figure 7:
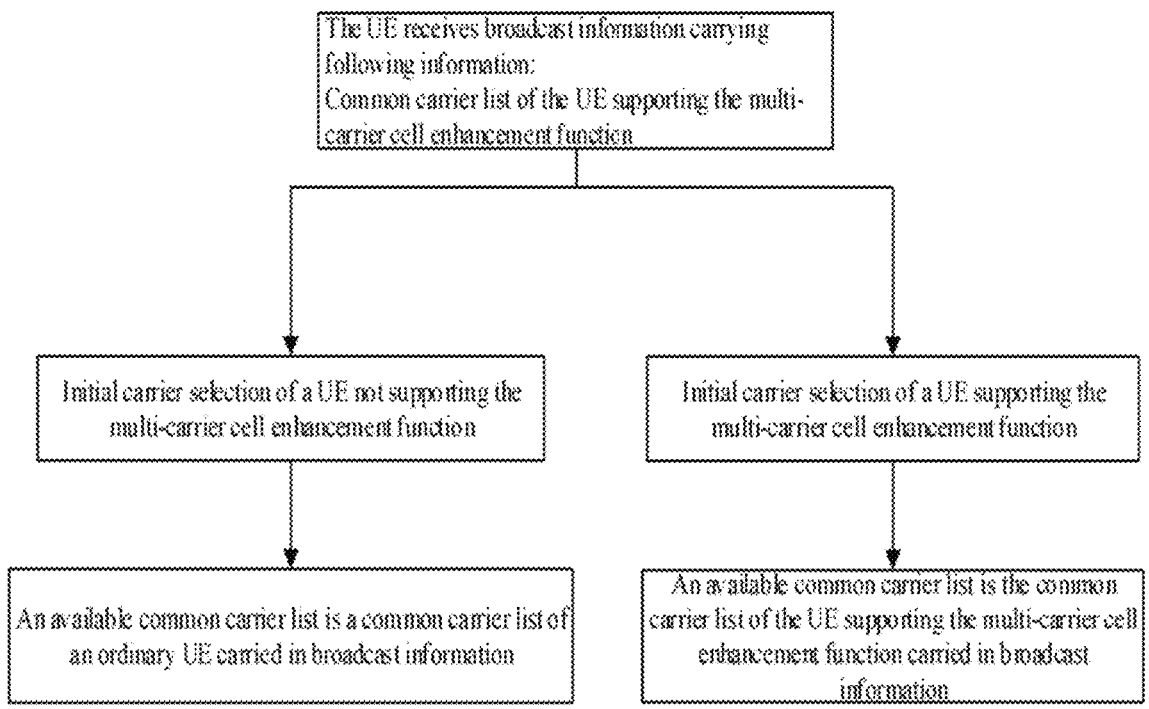
FIG. 7 is a flowchart of initial carrier selection when a UE receives a broadcast carrying a common carrier list of a UE supporting a multi-carrier cell enhancement function according to an embodiment of the present application.

FIG. 7 is an example of initial carrier selection when a UE receives a broadcast carrying a common carrier list of a UE supporting a multi-carrier cell enhancement function according to an embodiment of the present application.

In this example, common carrier lists are configured respectively for an ordinary UE and the UE supporting the multi-carrier cell enhancement function, and the UE selects a corresponding common carrier list according to the type of the UE.

In the initial carrier selection of a UE not supporting the multi-carrier cell enhancement function, an available common carrier list is a common carrier list of the ordinary UE carried in configuration information.

In the initial carrier selection of the UE supporting the multi-carrier cell enhancement function, an available common carrier list is the common carrier list of the UE supporting the multi-carrier cell enhancement function carried in configuration information. The initial carrier selection includes at least one of paging carrier selection or PRACH carrier selection.

EMBODIMENT 4

Figure 8:
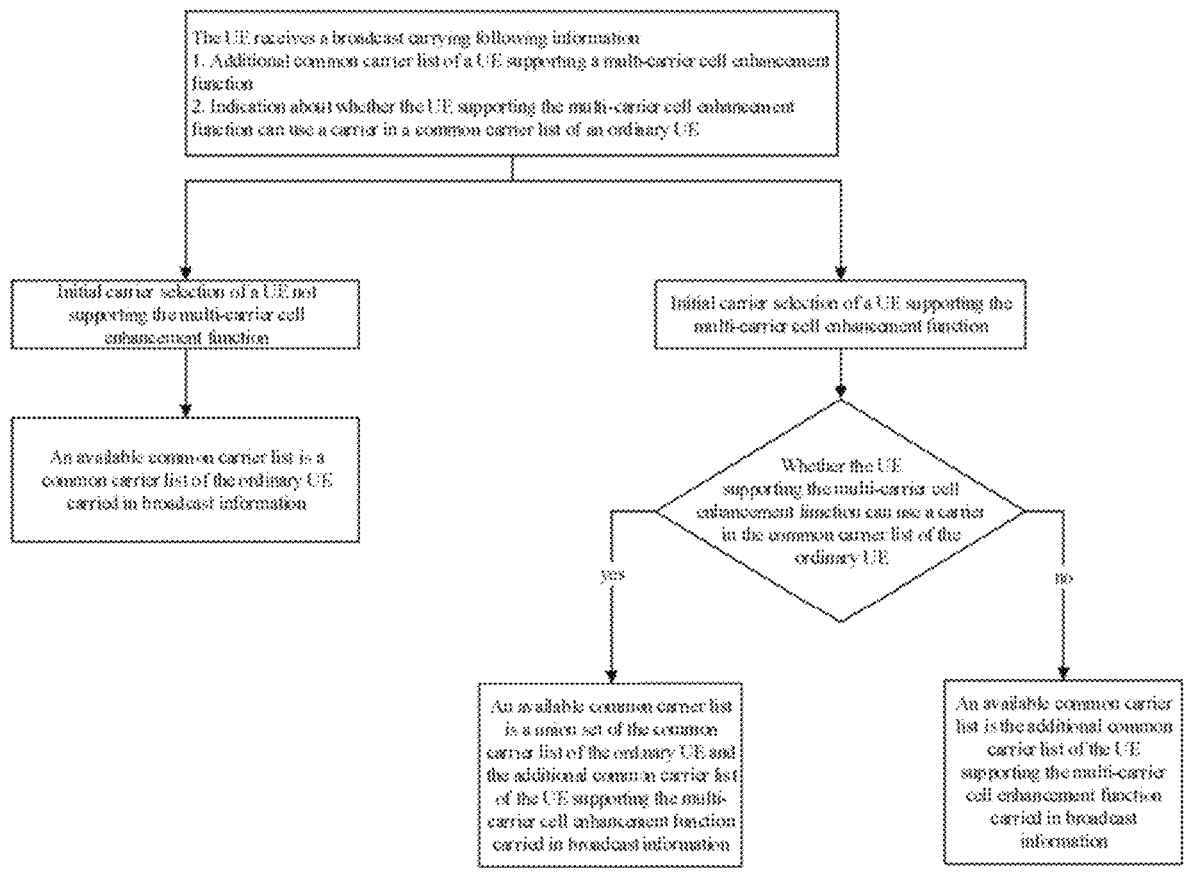
FIG. 8 is a flowchart of initial carrier selection when a UE receives a broadcast message carrying an additional common carrier list of a UE supporting a multi-carrier cell enhancement function and an indication about whether the UE supporting the multi-carrier cell enhancement function can use a carrier in a common carrier list of an ordinary UE according to an embodiment of the present application.

FIG. 8 is an example of initial carrier selection when a UE receives a broadcast message carrying an additional common carrier list of a UE supporting a multi-carrier cell enhancement function and an indication about whether the UE supporting the multi-carrier cell enhancement function can use a carrier in a common carrier list of an ordinary UE according to an embodiment of the present application. In this example:

In the initial carrier selection of a UE not supporting the multi-carrier cell enhancement function, an available common carrier list is a common carrier list of the ordinary UE carried in configuration information.

In the initial carrier selection of the UE supporting the multi-carrier cell enhancement function, an available common carrier list is determined based on an indication about whether the UE supporting the multi-carrier cell enhancement function can use a carrier in the common carrier list of the ordinary UE.

If the UE supporting the multi-carrier cell enhancement function can use the carrier in the common carrier list of the ordinary UE, an available common carrier list is a union set of the common carrier list of the ordinary UE and the additional common carrier list of the UE supporting the multi-carrier cell enhancement function carried in configuration information.

If the UE supporting the multi-carrier cell enhancement function cannot use the carrier in the common carrier list of the ordinary UE, an available common carrier list is the additional common carrier list of the UE supporting the multi-carrier cell enhancement function carried in configuration information.

The ordinary UE refers to the UE not supporting the multi-carrier cell enhancement function.

EMBODIMENT 5

Figure 9:
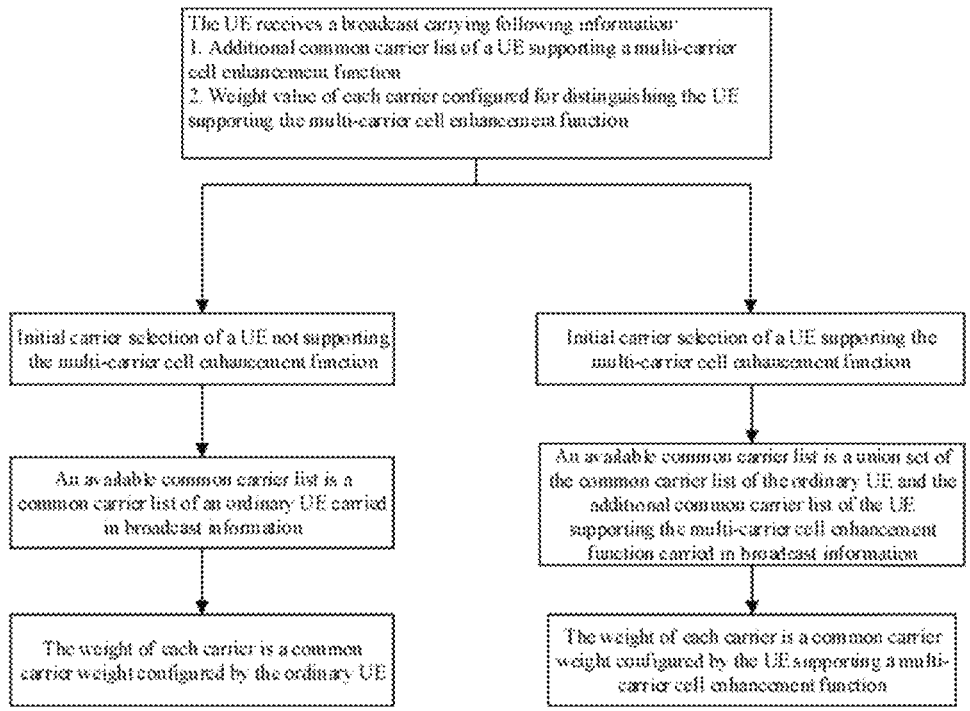
FIG. 9 is a flowchart when a UE receives a broadcast carrying an additional common carrier list of a UE supporting a multi-carrier cell enhancement function and a weight value of each carrier configured for distinguishing the UE supporting the multi-carrier cell enhancement function according to an embodiment of the present application.

FIG. 9 is an embodiment when a UE receives a broadcast carrying an additional common carrier list of a UE supporting a multi-carrier cell enhancement function and a weight value of each carrier configured for distinguishing the UE supporting the multi-carrier cell enhancement function according to an embodiment of the present application. In the embodiment: the main characteristic is that the UE supporting the multi-carrier cell enhancement function can us the common carrier list of the ordinary UE. Since the common carrier list of the ordinary UE can also be used by the ordinary UE, a selection weight of this carrier list is re-configured respectively according to the ordinary UE and the UE supporting the multi-carrier cell enhancement function.

The UE supporting the multi-carrier cell enhancement function may configure respectively the weight for using the common carrier list of the ordinary UE according to carriers, and may configure a total weight according to the carrier list. If the weight is configured according to carriers, the related UE can directly select a carrier according to the weight. If the total weight is configured according to the carrier list, the related UE first decides whether to select this carrier list according to the total weight, and then selects a specific carrier according to the weight in the carrier list if this carrier list is selected.

In the Embodiment:

For the initial carrier selection of a UE not supporting the multi-carrier cell enhancement function, an available common carrier list is the common carrier list of the ordinary UE carried in configuration information, and the weight value of each carrier is a common carrier weight value configured by the ordinary UE.

For the initial carrier selection of the UE supporting the multi-carrier cell enhancement function, an available common carrier list is a union set of the common carrier list of the ordinary UE and the additional common carrier list of the UE supporting the multi-carrier cell enhancement function carried in configuration information, where the weight value of each carrier in the additional common carrier list of the UE supporting the multi-carrier cell enhancement function is the weight value of each carrier in this list, and the weight value of each carrier in the common carrier list of the ordinary UE is the weight values configured for the UE supporting the multi-carrier cell enhancement function.

The weight values configured for the UE supporting the multi-carrier cell enhancement function may be configured according to carriers in the carrier list of the ordinary UE, or a total weight may be configured for the carrier list of the ordinary UE. If the weight values are configured according to carriers, the related UE can directly take a corresponding weight to select a carrier. If the total weight value is configured according to the carrier list, the related UE first decides whether to select this carrier list according to the total weight value, and then selects specific carriers according to the weight values in the carrier list if this carrier list is selected.

Figure 10:
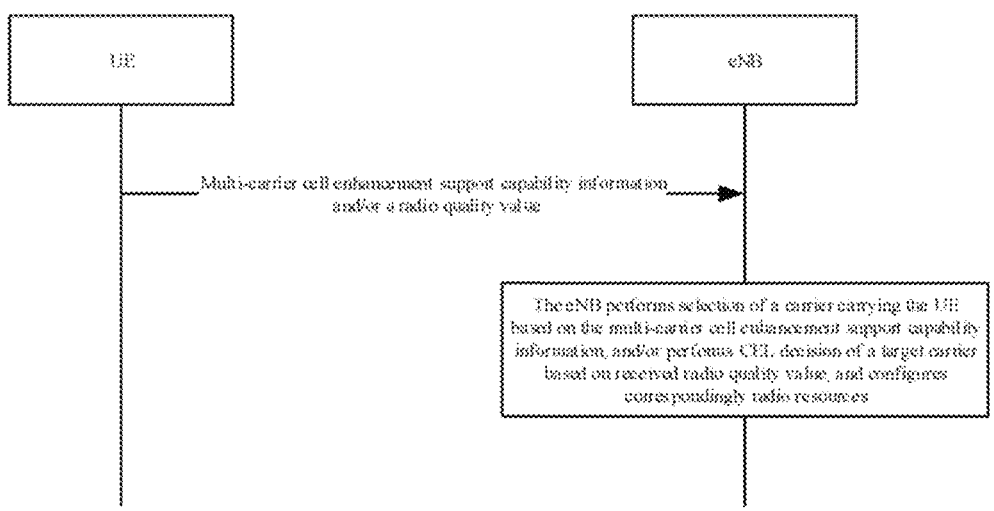
FIG. 10 is a flowchart of reporting of multi-carrier cell enhancement support capability information and/or a radio quality value from a UE to an eNB according to an embodiment of the present application.

EMBODIMENT 6 the embodiment of the present application provides an example of reporting of multi-carrier cell enhancement support capability information and/or a radio quality value from a UE to an eNB. Details are shown in FIG. 10.

The UE reports a multi-carrier cell enhancement function support capability and/or a radio quality value of the UE to the eNB.

The multi-carrier cell enhancement function support capability and/or the radio quality value of the UE may be reported through an element of an uplink RRC message, or may be reported through an MAC information unit carrying an association message. The RRC message includes at least one of: an RRC connection request message, an RRC connection recovery request message, an RRC connection reestablishment request message, an RRC connection establishment completion message, an RRC connection recovery completion message, an RRC connection reestablishment completion message, an RRC reconfiguration completion message, a UE capability information message, or a UE information response message. The radio quality value of the UE includes measured RSRP and/or a CEL mapped based on a measured value.

The measured RSRP is used for the base station to perform at least one of: a CEL decision of a target carrier/or configuring a quantity of repetitions of NPDCCH/NPDSCH of the target carrier.

The eNB sequentially performs selection of a carrier for carrying the UE and the CEL decision of the target carrier based on the multi-carrier cell enhancement support capability reported by the UE.

Figure 11:
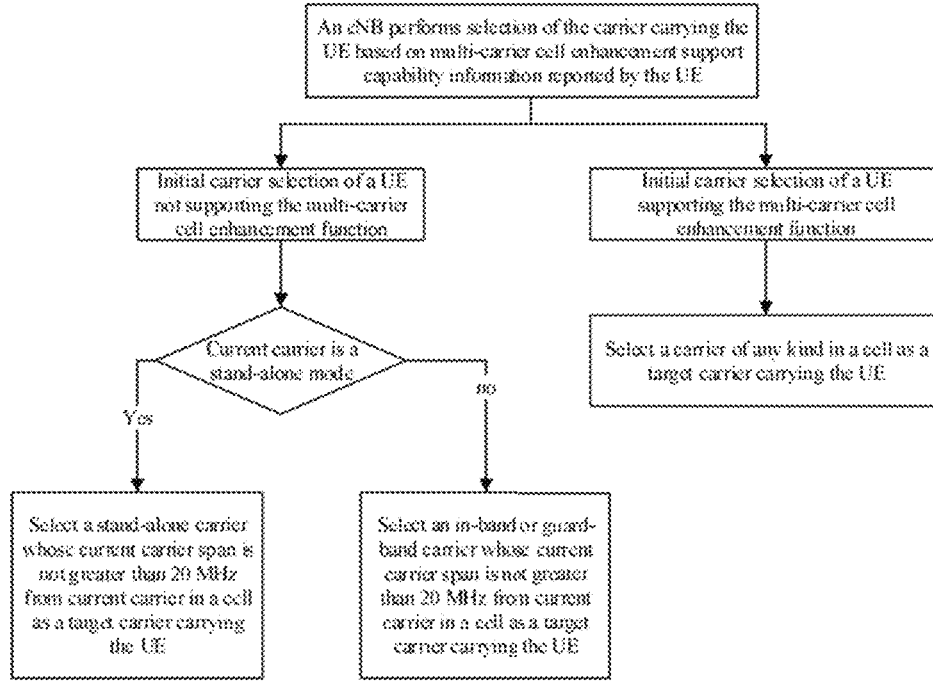
FIG. 11 is a flowchart of selection of a carrier for carrying a UE by an eNB based on a multi-carrier cell enhancement support capability reported by the UE according to an embodiment of the present application.

EMBODIMENT 7 the embodiment of the present application provides selection of a carrier carrying a UE by an eNB based on a multi-carrier cell enhancement support capability reported by the UE. Details are shown in FIG. 11.

If the eNB receives a multi-carrier cell enhancement function support indication reported by the UE, a carrier of any mode in a cell and/or a carrier of an enhanced frequency span may be selected as a target carrier when the carrier for carrying the UE is selected.

If the eNB does not receive multi-carrier cell enhancement function information reported by the UE or the eNB receives an indication of not supporting the multi-carrier cell enhancement function reported by the UE, when the carrier carrying the UE is selected, there will be two situations described below.

If a current carrier is a stand-alone mode, only a carrier in the stand-alone mode having a span not greater than 20 MHz from the current carrier is selected as the target carrier. If a current carrier is an in-band or guard-band mode, only a carrier in the in-band mode or the guard band mode having a span not greater than 20 MHz from the current carrier is selected as the target carrier.

EMBODIMENT 8

Figure 12:
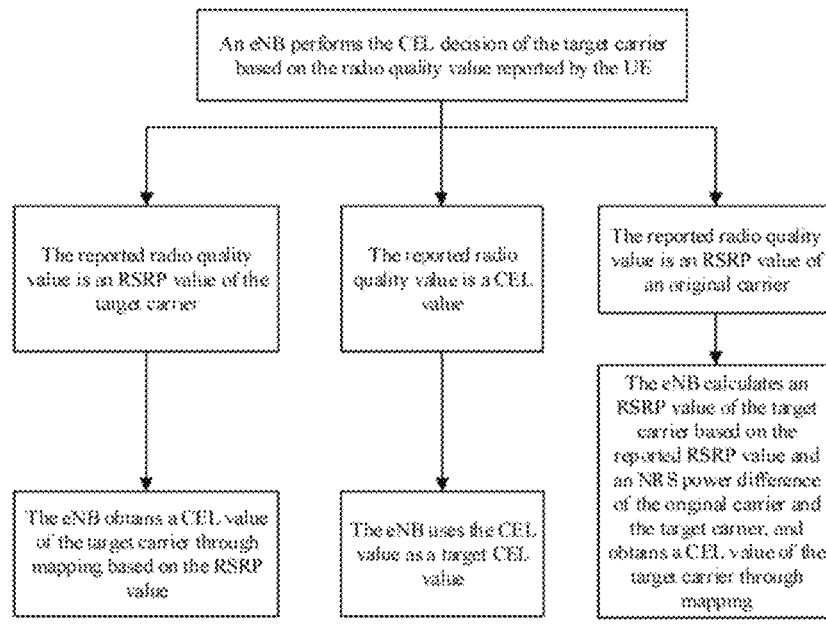
FIG. 12 is a flowchart of a CEL decision of a target carrier by an eNB based on a radio quality value reported by a UE according to an embodiment of the present application.

The embodiment of the present application provides an example of a CEL decision of a target carrier of an eNB based on a radio quality value reported by a UE. Details are shown in FIG. 12. The CEL decision of the target carrier by the eNB based on the radio quality value reported by the UE includes steps described below.

If the reported radio quality value is an RSRP value of the target carrier, the eNB performs at least one of: obtaining a CEL value of the target carrier through a mapping based on the RSRP valueor configuring a quantity of repetitions of NPDCCH/NPDSCH of the target carrier based on the RSRP value;

if the reported radio quality value is a CEL value, the eNB uses the CEL value as a target CEL value; or if the reported radio quality value is an RSRP value of an original carrier, the eNB calculates an RSRP value of the target carrier based on the reported RSRP value and an NRS power difference of the original carrier and the target carrier; and the eNB performs at least one of: obtaining a CEL value of the target carrier through a mapping, or configuring a quantity of repetitions of NPDCCH/NPDSCH of the target carrier based on the RSRP value of the target carrier.

Figure 13:
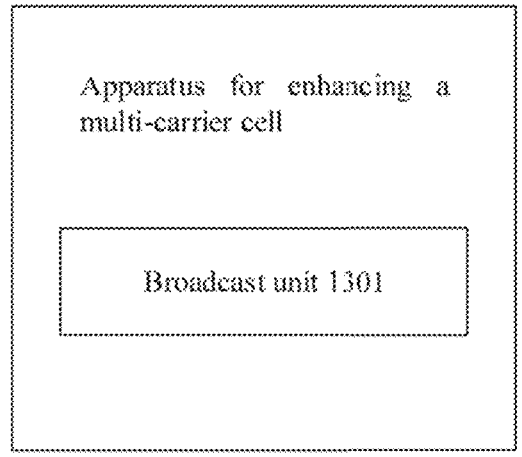
FIG. 13 is a structural diagram one of an apparatus for enhancing a multi-carrier cell according to an embodiment of the present application.

FIG. 13 is a structural diagram one of an apparatus for enhancing a multi-carrier cell according to an embodiment of the present application. The apparatus is applied to a base station. As shown in FIG. 13, the apparatus includes a broadcast unit 1301.

The broadcast unit 1301 is configured to, when broadcasting a common carrier list of the multi-carrier cell, broadcast at least one piece of following configuration information simultaneously: a first common carrier list of a first-type UE, or a second common carrier list of the first-type UE. The first-type UE is a UE supporting a multi-carrier cell enhancement function; and if the broadcast configuration information includes the second common carrier list of the first-type UE, simultaneously broadcast indication information about whether the first-type UE can use a carrier in a common carrier list of a second-type UE, or a weight value of each carrier configured for the first-type UE, where the second-type UE is a UE not supporting the multi-carrier cell enhancement function.

In the embodiment of the present application, the common carrier list includes at least one of: an uplink common carrier list, a downlink common carrier list, a paging carrier list, or a random access channel carrier list.

In the embodiment of the present application, supporting the multi-carrier cell enhancement function includes at least one of: supporting a multi-carrier cell consisting of an in-band mode and a stand-alone mode, supporting a multi-carrier cell consisting of a guard band mode and a stand-alone mode, supporting a multi-carrier cell whose carrier span exceeds a preset bandwidth, supporting a multi-carrier cell consisting of a FDD mode carrier and a TDD mode carrier, or supporting a multi-carrier cell consisting of TDD carriers with different configurations of uplink and downlink time slots.

It should be understood by those skilled in the art that implementation of functions of various units of the apparatus for enhancing a multi-carrier cell of FIG. 13 may be understood with reference to the description of the foregoing method for enhancing a multi-carrier cell.

An embodiment of the present application further provides an apparatus for enhancing a multi-carrier cell. The apparatus includes one or more processors (the processor may include, but is not limited to, a processing device such as a micro control unit (MCU) or a field-programmable gate array (FPGA)), a memory configured to store data, and a transmission apparatus for a communication function. It should be understood by those skilled in the art that the apparatus for enhancing a multi-carrier cell may further include more or less components. The memory in the apparatus for enhancing a multi-carrier cell stores various units in the apparatus for enhancing a multi-carrier cell shown in FIG. 13.

Figure 14:
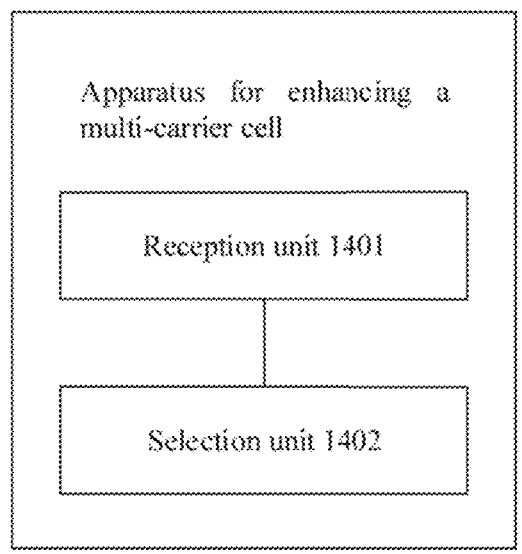
FIG. 14 is a structural diagram two of an apparatus for enhancing a multi-carrier cell according to an embodiment of the present application.

FIG. 14 is a structural diagram two of an apparatus for enhancing a multi-carrier cell according to an embodiment of the present application. The apparatus is applied to a UE. As shown in FIG. 14, the apparatus includes a reception unit 1401 and a selection unit 1402.

The reception unit 1401 is configured to receive configuration information broadcast by a base station.

The selection unit 1402 is configured to select a target carrier according to a type of the UE and the configuration information.

The configuration information includes at least one of: a first common carrier list of a first-type UE, or a second common carrier list of the first-type UE. The first-type UE is a UE supporting a multi-carrier cell enhancement function. If the broadcast configuration information includes the second common carrier list of the first-type UE, the broadcast configuration information further comprises indication information about whether the first-type UE can use a carrier in a common carrier list of a second-type UE, or a weight value of each carrier configured for the first-type UE. The second-type UE is a UE not supporting the multi-carrier cell enhancement function.

In the embodiment of the present application, if the configuration information received by the reception unit 1401 carries the first common carrier list of the first-type UE, there will be two situations described below.

In a condition that the type of the UE is the second-type UE, the configuration information further carries the common carrier list of the second-type UE, and a common carrier list that can be used by the second-type UE is the common carrier list of the second-type UE carried in the configuration information.

In a condition that the type of the UE is the first-type UE, a common carrier list that can be used by the first-type UE is the first common carrier list of the first-type UE carried in the configuration information.

In the embodiment of the present application, if the configuration information received by the reception unit 1401 carries the second common carrier list of the first-type UE, there will be one situation described below.

In a condition that the type of the UE is the second-type UE, the configuration information further carries the common carrier list of the second-type UE, and a common carrier list that can be used by the second-type UE is the common carrier list of the second-type UE carried in the configuration information. If the configuration information carries a weight value of each carrier configured for the second-type UE, a weight value of a common carrier that can be used by the second-type UE in initial carrier selection is determined based on the weight value of each carrier configured for the second-type UE.

In the embodiment of the present application, if the configuration information received by the reception unit 1401 carries the second common carrier list of the first-type UE, there will be two situations described below.

In a condition that the type of the UE is the first-type UE, if the configuration information carries indication information that the first-type UE cannot use the carrier in the common carrier list of the second-type UE, a common carrier list that can be used by the first-type UE is the second common carrier list of the first-type UE carried in the configuration information.

In a condition that the type of the UE is the first-type UE, if the configuration information does not carry the indication information about whether the first-type UE can use the carrier in the common carrier list of the second-type UE, or carries indication information that the first-type UE can use the carrier in the common carrier list of the second-type UE, a common carrier list that can be used by the first-type UE is a union set of the common carrier list of the second-type UE and the second common carrier list of the first-type UE carried in the configuration information.

In the embodiment of the present application, if the configuration information received by the reception unit 1401 carries the second common carrier list of the first-type UE, there will be one situation described below.

In a condition that the type of the UE is the first-type UE, if the configuration information carries the weight value of each carrier configured for the first-type UE, a common carrier list that can be used by the first-type UE in initial carrier selection is a union set of the common carrier list of the second-type UE and the second common carrier list of the first-type UE, where a weight value of each carrier in the common carrier list is determined based on the weight value of each carrier configured for the first-type UE.

In the embodiment of the present application, the initial carrier selection includes at least one of paging carrier selection or random access carrier selection.

It should be understood by those skilled in the art that implementation of functions of various units of the apparatus for enhancing a multi-carrier cell of FIG. 14 may be understood with reference to the description of the foregoing method for enhancing a multi-carrier cell.

An embodiment of the present application further provides an apparatus for enhancing a multi-carrier cell. The apparatus includes one or more processors (the processor may include, but is not limited to, a processing device such as an MCU or an FPGA), a memory configured to store data, and a transmission apparatus for a communication function. It should be understood by those skilled in the art that the apparatus for enhancing a multi-carrier cell may further include more or less components. The memory in the apparatus for enhancing a multi-carrier cell stores various units in the apparatus for enhancing a multi-carrier cell shown in FIG. 14.

Figure 15:
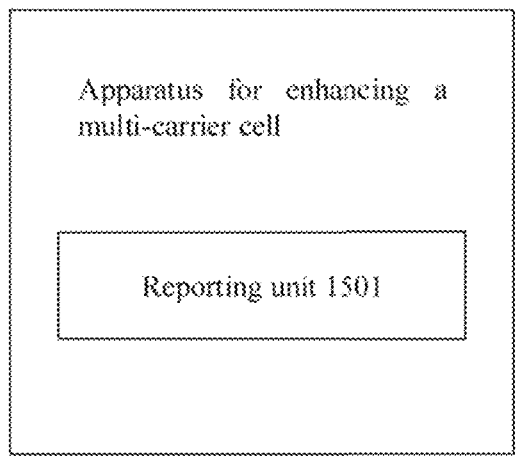
FIG. 15 is a structural diagram three of an apparatus for enhancing a multi-carrier cell according to an embodiment of the present application.

FIG. 15 is a structural diagram three of an apparatus for enhancing a multi-carrier cell according to an embodiment of the present application. The apparatus is applied to a UE. As shown in FIG. 15, the apparatus includes a reporting unit 1501.

The reporting unit 1501 is configured to report at least one piece of following information to a base station: a multi-carrier cell enhancement function support capability, or a radio quality value of where the UE locates.

At least one of the multi-carrier cell enhancement function support capability or the wireless quality value of where the UE locates is reported through at least one of following contents: an information element of an uplink RRC message, or an MAC information unit carrying an association message.

In the embodiment of the present application, the RRC message includes at least one of: an RRC connection request message, an RRC connection recovery request message, an RRC connection reestablishment request message, an RRC connection establishment completion message, an RRC connection recovery completion message, an RRC connection reestablishment completion message, an RRC reconfiguration completion message, a UE capability information message, or a UE information response message.

In the embodiment of the present application, the radio quality value of where the UE locates includes at least one of a measured RSRP or a CEL obtained through mapping based on a measured value.

The measured RSRP is used for the base station to perform at least one of: a CEL decision of a target carrier or configuring a quantity of repetitions of NPDCCH/NPDSCH of the target carrier. It should be understood by those skilled in the art that implementation of functions of various units of the apparatus for enhancing a multi-carrier cell of FIG. 15 may be understood with reference to the description of the foregoing method for enhancing a multi-carrier cell.

An embodiment of the present application further provides an apparatus for enhancing a multi-carrier cell. The apparatus includes one or more processors (the processor may include, but is not limited to, a processing device such as an MCU or an FPGA), a memory configured to store data, and a transmission apparatus for a communication function. It should be understood by those skilled in the art that the apparatus for enhancing a multi-carrier cell may further include more or less components. The memory in the apparatus for enhancing a multi-carrier cell stores various units in the apparatus for enhancing a multi-carrier cell shown in FIG. 15.

Figure 16:
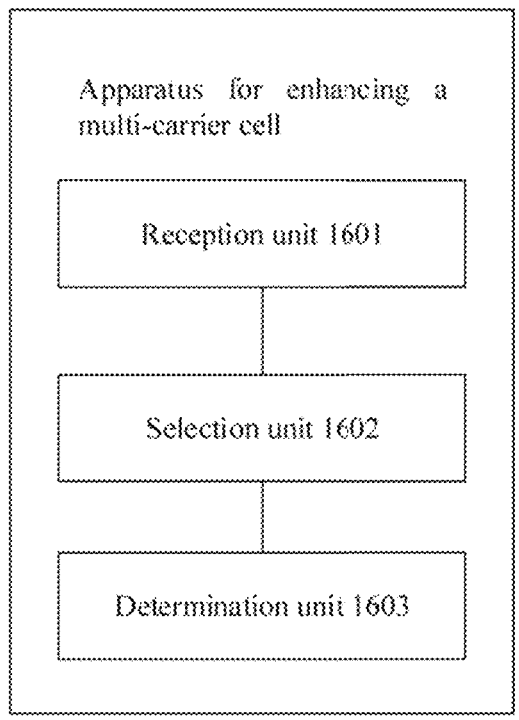
FIG. 16 is a structural diagram four of an apparatus for enhancing a multi-carrier cell according to an embodiment of the present application.

FIG. 16 is a structural diagram four of an apparatus for enhancing a multi-carrier cell according to an embodiment of the present application. The apparatus is applied to a base station. As shown in FIG. 16, the apparatus includes a reception unit 1601 and a selection unit 1602.

The reception unit 1601 is configured to receive a multi-carrier cell enhancement function support capability reported by a UE.

The selection unit 1602 is configured to select a carrier for carrying the UE based on the multi-carrier cell enhancement function support capability.

In the embodiment of the present application, if the reception unit1 1601 receives indication information, reported by the UE, of supporting a multi-carrier cell enhancement function, at least one of a carrier of any mode in a cell or a carrier with an enhanced frequency span is selected as a target carrier when the carrier for carrying the UE is selected.

In the embodiment of the present application, if the reception unit1 1601 does not receive the indication information, reported by the UE, of supporting the multi-carrier cell enhancement function or the base station receives indication information, reported by the UE, of not supporting the multi-carrier cell enhancement function, when selecting the carrier for carrying the UE:
- if a current carrier is a stand-alone mode, a carrier in the stand-alone mode having a span smaller than or equal to a preset bandwidth from the current carrier is selected as the target carrier;
- if a current carrier is an in-band mode or a guard band mode, a carrier in the in-band mode or the guard band mode having a span smaller than or equal to a preset bandwidth from the current carrier is selected as the target carrier.

In the embodiment of the present application, the apparatus further includes a determination unit 1603.

The determination unit 1603 is configured to determine a CEL of the target carrier based on a radio quality value reported by the UE, which specifically includes situations described below:
- if the reported radio quality value is an RSRP value of the target carrier, the base station performs at least one of: obtaining a CEL value of the target carrier through a mapping based on the RSRP valueor configuring a quantity of repetitions of NPDCCH/NPDSCH of the target carrier based on the RSRP; or
- if the reported radio quality value is a CEL value of the target carrier, the base station sets the CEL value as the CEL value of the target carrier;
- if the reported radio quality value is an RSRP value of an original carrier, the base station calculates an RSRP value of the target carrier based on the reported RSRP value and an NRS power difference between the original carrier and the target carrier; and the base station performs at least one of: obtaining a CEL value of the target carrier through a mappingor configuring a quantity of repetitions of NPDCCH/NPDSCH of the target carrier based on the RSRP value of the target carrier.

It should be understood by those skilled in the art that implementation of functions of various units of the apparatus for enhancing a multi-carrier cell of FIG. 16 may be understood with reference to the description of the foregoing method for enhancing a multi-carrier cell.

An embodiment of the present application further provides an apparatus for enhancing a multi-carrier cell. The apparatus includes one or more processors (the processor may include, but is not limited to, a processing device such as an MCU or an FPGA), a memory configured to store data, and a transmission apparatus for a communication function.

It should be understood by those skilled in the art that the apparatus for enhancing a multi-carrier cell may further include more or less components. The memory in the apparatus for enhancing a multi-carrier cell stores various units in the apparatus for enhancing a multi-carrier cell shown in FIG. 16.

It should be understood by those skilled in the art that the embodiments of the present application may be provided as methods, systems and computer program products. Therefore, the present application can take the form of a hardware embodiment, a software embodiment, or a combination of software and hardware embodiments. In addition, the present application may take the form of a computer program product implemented on one or more computer-usable storage media (including, but not limited to, a disk memory and an optical memory) that includes computer-usable program codes.

The present application is described with reference to flowcharts and/or block diagrams of methods, devices (systems) and computer program products according to the embodiments of the present application. It should be understood that computer program instructions may implement each flow and/or block in the flowcharts and/or block diagrams and a combination of flows and/or blocks in the flowcharts and/or block diagrams. These computer program instructions can be provided to a processor of a general purpose computer, special purpose computer, embedded processor, or another programmable data processing device to produce a machine, so as to enable instructions executed by a processor of a computer or another programmable data processing device to generate an apparatus for implementing the functions specified in one or more flows in the flowcharts and/or one or more blocks in the block diagrams.

These computer program instructions may also be stored in a computer-readable memory which may direct the computer or another programmable data processing device to operate in a particular manner so that the instructions stored in the computer-readable memory produce a manufactured product including an instructing means. The instructing means implements the functions specified in one or more flows in the flowcharts and/or one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

Accordingly, the embodiments of the present application further provide a computer storage medium, which is configured to store computer instructions for executing the method for enhancing a multi-carrier cell according to the embodiments of the present application. The above are only preferred embodiments of the present application and are not intended to limit the scope of the present application.

INDUSTRIAL APPLICABILITY

In the technical solution of the embodiments of the present application, a base station, when broadcasting a common carrier list of a multi-carrier cell, broadcasts at least one piece of following configuration information at the same time: a first common carrier list of a first-type UE, or a second common carrier list of the first-type UE, where the first-type UE is a UE supporting a multi-carrier cell enhancement function, and if the broadcast configuration information includes the second common carrier list of the UE, the base station simultaneously broadcasts indication information about whether the first-type UE can use a carrier in a common carrier list of a second-type UE, or a weight value of each carrier configured for the first-type UE is broadcast at the same time, where the second-type UE is a UE not supporting the multi-carrier cell enhancement function. The UE receives configuration information broadcast by a base station, and selects a target carrier according to a type of the UE and the configuration information. By adopting the technical solution of the embodiments of the present application, the limitation existing among carriers of the NB-IoT multi-carrier cell is overcame and the performance of the NB-IoT network is improved through configuration of the carrier and the corresponding selection manner.

What is claimed is:

1. A method for a multi-carrier cell, comprising:
broadcasting, by a base station, configuration information to make a user equipment (UE) select a target carrier according to a type of the UE and the configuration information, wherein the type of the UE comprises a first-type UE which supports an enhanced multi-carrier cell and a second-type UE which does not support the enhanced multi-carrier cell, wherein the enhanced multi-carrier cell comprises at least a multi-carrier cell consisting of a carrier in an in-band mode of a NB-IOT (NarrowBand-Internet of Things) carrier and a carrier in a stand-alone mode of the NB-IOT carrier, or the enhanced multi-carrier cell comprises at least a multi-carrier cell consisting of a carrier in a guard band mode of a NB-IOT carrier and a carrier in a stand-alone mode of the NB-IOT carrier;
wherein the configuration information comprises:
common carrier list of the first-type UE, a common carrier list of the second-type UE, and indication information indicating whether the common carrier list of the second-type UE is available for the first-type UE, wherein whether the common carrier list of the second-type UE is available for the first-type UE is indicated by whether indication information is comprised in the configuration information.

2. The method of claim 1, wherein each of the common carrier list of the first-type UE and the common carrier list of the second-type UE comprises a at least one of: an uplink common carrier list and a downlink common carrier list.

3. The method of claim 1, wherein the indication information indicates whether the common carrier list of the second-type UE is available for the first-type UE comprises:
if the configuration information does not comprise the indication information indicating that the common carrier list of the second-type UE is available for the first-type UE, a common carrier list capable to be used by the first-type UE is the second common carrier list of the first-type UE carried in the configuration information; or
if the configuration information comprises the indication information indicating that the common carrier list of the second-type UE is available for the first-type UE, a common carrier list capable to be used by the first-type UE is a union set of the common carrier list of the second-type UE and the second common carrier list of the first-type UE carried in the configuration information.

4. A method for a multi-carrier cell, comprising:
receiving, by a user equipment (UE), configuration information broadcast by a base station, and
selecting a target carrier according to a type of the UE and the configuration information, wherein the type of the UE comprises a first-type UE which supports an enhanced multi-carrier cell and a second-type UE which does not support the enhanced multi-carrier cell, wherein the enhanced multi-carrier cell comprises at least a multi-carrier cell consisting of a carrier in an in-band mode of a NB-IOT (NarrowBand-Internet of Things) carrier and a carrier in a stand-alone mode of the NB-IOT carrier, or the enhanced multi-carrier cell comprises at least a multi-carrier cell consisting of a carrier in a guard band mode of a NB-IOT carrier and a carrier in a stand-alone mode of the NB-IOT carrier;
wherein the configuration information comprises:
a common carrier list of the first-type UE, a carrier list of the second-type UE, and indication information indicating whether the common carrier list of the second-type UE is available for the first-type UE, wherein whether the common carrier list of the second-type UE is available for the first-type UE is indicated by whether indication information is comprised in the configuration information.

5. The method of claim 4, wherein the indication information indicates whether the common carrier list of the second-type UE is available for the first-type UE comprises:
if the configuration information does not comprise the indication information indicating that the common carrier list of the second-type UE is available for the first-type UE, a common carrier list capable to be used by the first-type UE is the second common carrier list of the first-type UE carried in the configuration information; or
if the configuration information comprises the indication information indicating that the common carrier list of the second-type UE is available for the first-type UE, a common carrier list capable to be used by the first-type UE is a union set of the common carrier list of the second-type UE and the second common carrier list of the first-type UE carried in the configuration information.

6. An apparatus for a multi-carrier cell, applied to a base station, comprising:
a broadcast unit, which is configured to: broadcast configuration information to make a user equipment (UE) select a target carrier according to a type of the UE and the configuration information, wherein the type of the UE comprises a first-type UE which supports an enhanced multi-carrier cell and a second-type UE which does not support the enhanced multi-carrier cell, wherein the enhanced multi-carrier cell comprises at least a multi-carrier cell consisting of a carrier in an in-band mode of a NB-IOT (NarrowBand-Internet of Things) carrier and a carrier in a stand-alone mode of the NB-IOT carrier, or the enhanced multi-carrier cell comprises at least a multi-carrier cell consisting of a carrier in a guard band mode of a NB-IOT carrier and a carrier in a stand-alone mode of the NB-IOT carrier,
wherein the configuration information comprises
a common carrier list of the first-type UE, a common carrier list of the second-type UE, and indication information indicating whether the common carrier list of the second-type UE is available for the first-type UE, wherein whether the common carrier list of the second-type UE is available for the first-type UE is indicated by whether indication information is comprised in the configuration information.

7. The apparatus of claim 6, wherein each of the first common carrier list of the first-type UE and the common carrier list of the second-type UE comprises a first-type at least one of: an uplink common carrier list and a downlink common carrier list.

8. The apparatus of claim 6, wherein the indication information indicates whether the common carrier list of the second-type UE is available for the first-type UE comprises:
   if the configuration information does not comprise the indication information indicating that the common carrier list of the second-type UE is available for the first-type UE, a common carrier list capable to be used by the first-type UE is the second common carrier list of the first-type UE carried in the configuration information; or
   if the configuration information comprises the indication information indicating that the common carrier list of the second-type UE is available for the first-type UE, a common carrier list capable to be used by the first-type UE is a union set of the common carrier list of the second-type UE and the second common carrier list of the first-type UE carried in the configuration information.

9. An apparatus for enhancing a multi-carrier cell, applied to a user equipment (UE), comprising:
   a reception unit, which is configured to receive configuration information broadcast by a base station; and
   a selection unit, which is configured to select a target carrier according to a type of the UE and the configuration information, wherein the type of the UE comprises a first-type UE which supports an enhanced multi-carrier cell and a second-type UE which does not support the enhanced multi-carrier cell, wherein the enhanced multi-carrier cell comprises at least a multi-carrier cell consisting of a carrier in an in-band mode of a NB-IoT (NarrowBand-Internet of Things) carrier and a carrier in a stand-alone mode of the NB-IOT carrier, or the enhanced multi-carrier cell comprises at least a multi-carrier cell consisting of a carrier in a guard band mode of a NB-IOT carrier and a carrier in a stand-alone mode of the NB-IOT carrier;
   wherein the configuration information comprises:
      a common carrier list of the first-type UE, a common carrier list of the second-type UE, and indication information indicating whether the common carrier list of the second-type UE is available for the first-type UE, wherein whether the common carrier list of the second-type UE is available for the first-type UE is indicated by whether indication information is comprised in the configuration information.

10. The apparatus of claim 9, wherein the indication information indicates whether the common carrier list of the second-type UE is available for the first-type UE comprises:
   if the configuration information does not comprise the indication information indicating that the common carrier list of the second-type UE is available for the first-type UE, a common carrier list capable to be used by the first-type UE is the second common carrier list of the first-type UE carried in the configuration information; or
   if the configuration information comprises the indication information indicating that the common carrier list of the second-type UE is available for the first-type UE, a common carrier list capable to be used by the first-type UE is a union set of the common carrier list of the second-type UE and the second common carrier list of the first-type UE carried in the configuration information.

11. A non-transitory computer storage medium, which is configured to store computer-executable instructions for executing the method of claim 1.

12. A non-transitory computer storage medium, which is configured to store computer-executable instructions for executing the method of claim 4.

\* \* \* \* \*